United States Patent [19]

Murata

[11] Patent Number: 5,742,589
[45] Date of Patent: Apr. 21, 1998

[54] RADIO APPARATUS

[75] Inventor: Takashi Murata, Amagasaki, Japan

[73] Assignee: Mitsubishi Denki Kabushiki Kaisha, Japan

[21] Appl. No.: 495,998

[22] Filed: Jun. 28, 1995

[30] Foreign Application Priority Data

Jul. 1, 1994 [JP] Japan ................... 6-151238

[51] Int. Cl.$^6$ ............................................. H04J 3/12
[52] U.S. Cl. ................... 370/249; 370/280; 370/459; 370/528; 455/67.4
[58] Field of Search ............................ 370/13, 15, 16, 370/17, 14, 85.7, 95.1, 95.3, 110.1, 29, 241, 248, 249, 252, 276, 277, 279, 280, 282, 293, 294, 310, 328, 329, 336, 341, 347, 431, 437, 458, 459, 464, 465, 468, 522, 528; 455/126, 67.4, 67.1, 33.1, 115, 54.1, 53.1

[56] References Cited

U.S. PATENT DOCUMENTS

| 4,688,208 | 8/1987 | Kawaguchi | 370/15 |
| 4,860,281 | 8/1989 | Finley et al. | 370/15 |
| 5,157,661 | 10/1992 | Kanai et al. | 370/95.1 |
| 5,231,632 | 7/1993 | Yamao et al. | 370/29 |
| 5,239,536 | 8/1993 | Masuko et al. | 370/15 |
| 5,260,944 | 11/1993 | Tomabechi | 370/95.1 |
| 5,265,089 | 11/1993 | Yonehara | 370/15 |
| 5,481,186 | 1/1996 | Heutmaker et al. | 455/115 |
| 5,521,904 | 5/1996 | Eriksson et al. | 370/15 |

FOREIGN PATENT DOCUMENTS 62-268246   11/1987   Japan.

Primary Examiner—Wellington Chin
Assistant Examiner—Huy D. Vu
Attorney, Agent, or Firm—Rothwell, Figg, Ernst & Kurz, P.C.

[57] ABSTRACT

A radio apparatus according to a TDMA/TDD system uses its own transmitter and receiver so as to perform a loopback test for checking normality of the apparatus during a period of an unassigned slot. A loopback test signal is output from its own transmitter during an unassigned transmitting slot and is received by its own receiver. The signal is temporarily stored in a memory and is read during an unassigned receiving slot. The apparatus thus performs a loopback test. Since a loopback test can be performed by use of its own transmitter and receiver during an unassigned slot, a transmitting and receiving device (tester) specifically used for a loopback test is not required. Also, a loopback test can be carried out even while normal communications are being made.

7 Claims, 14 Drawing Sheets

RADIO APPARATUS

BACKGROUND OF THE INVENTION

1. Field of the Invention

The present invention relates to a radio apparatus, for example, a car phone base station, which performs radio communications with a plurality of mobile stations (car phones, transportable phones and the like) according to a TDMA (Time Division Multiple Access)/TDD (Time Division Duplex) system. This TDMA/TDD system is employed whereby transmitting information and receiving information can be alternately transmitted and received to effect multiplex transmission by use of respective channels of a plurality of radio carriers allocated to digital cordless phones.

2. Description of the Related Art

The construction of a typical conventional radio apparatus will now be explained with reference to FIG. 14. FIG. 14 is a block diagram illustrative of the construction of a radio apparatus, such as a car phone base station.

Referring to FIG. 14, a radio apparatus (base station) 1, such as a car phone base station, comprises a transmitter 2, a receiver 3, an antenna change-over switch 4 for switching between transmitting and receiving modes, a transmitting/receiving antenna 5 used for normal communications, a transmitting/receiving device 6 used for loopback tests (tester), an antenna change-over switch 9 for switching between transmitting and receiving modes, and a transmitting/receiving antenna 10 used for loopback tests. The loopback test transmitting/receiving device further includes a loopback test transmitter 7 and a loopback test receiver 8. The base station 1 also comprises a controller formed of CPU, RAM, ROM, interfaces and the like, though not shown.

A description will now be given of the operation of the conventional radio apparatus constructed as described above. As shown in FIG. 14, radio waves transmitted from the transmitter 2 of the radio apparatus 1 are received by the loopback test receiver 8, or radio waves transmitted from the loopback test transmitter 7 are received by the receiver 3 of the radio apparatus 1, whereby it can be conventionally checked that the radio apparatus 1 properly operates.

That is, the radio apparatus 1 comprises the transmitter 2, the receiver 3, and the loopback test transmitting/receiving device 6 which is formed of the loopback test transmitter 7 and receiver 8. For performing a loopback test, a signal from the transmitter 2 is transmitted through the transmitting/receiving antenna 5 used for normal communications and is received by the loopback test receiver 8 through the loopback test transmitting/receiving antenna 10. If this receiving operation is correctly accomplished, it can be checked that the transmitter 2 and the antenna 5 properly operate.

On the other hand, a signal from the loopback test transmitter 7 is transmitted through the loopback test transmitting/receiving antenna 10 and is received by the receiver 3 through the antenna 5 used for normal communications. If this receiving operation is correctly accomplished, it can be checked that the antenna 5 and the receiver 3 properly operate.

However, the above-described conventional radio apparatus 1 has a problem in that the transmitting/receiving device (tester) 6 specifically used for loopback tests should be arranged within the apparatus 1.

The apparatus 1 also presents the following problem. When the loopback test indicates poor results, it is difficult to identify which element is faulty, i.e., the transmitter 2, the receiver 3, or the loopback test transmitting/receiving device (tester) 6.

SUMMARY OF THE INVENTION

Accordingly, in order to solve the above problems, an object of the present invention is to provide a radio apparatus which is able to perform a loopback test without requiring a transmitting and receiving device (tester) specifically used for a loopback test.

In order to achieve the above objects, according to a first aspect of the present invention, there is provided a radio apparatus according to a TDMA/TDD system, comprising: a transmitter for transmitting loopback test data during an unassigned transmitting slot which is not occupied for communicating with a mobile station; an attenuator for attenuating the loopback test data transmitted from the transmitter; a receiver for receiving the loopback test data attenuated by the attenuator during the transmitting slot; a memory for storing the loopback test data received by the receiver; and a controller including a transmitting signal processing section and receiving signal processing section, the transmitting signal processing section generating the loopback test data and transmitting it to the transmitter, the receiving signal processing section comparing the loopback test data read from the memory during an unassigned receiving slot which is not occupied for communicating with the mobile station with the loopback test data generated in the transmitting signal processing section, and upon such a comparison, issuing an alarm when an abnormality has occurred.

According to a second aspect of the present invention, there is provided a radio apparatus according to a TDMA/TDD system, comprising: a transmitter for transmitting communication data during a transmitting slot which is occupied for communicating with a mobile station; an attenuator for attenuating the communication data transmitted from the transmitter; a receiver for receiving the communication data attenuated by the attenuator during the transmitting slot; a memory for storing the communication data received by the receiver; and a controller including a transmitting signal processing section and a receiving signal processing section, the transmitting signals processing section generating the communication data and transmitting it to the transmitter, the receiving signal processing section comparing the communication data read from the memory during an unassigned receiving slot which is not occupied for communicating with the mobile station with the communication data generated in the transmitting signal processing section, and upon such a comparison, issuing an alarm when an abnormality has occurred.

According to a third aspect of the present invention, there is provided a radio apparatus according to a TDMA/TDD system, comprising: a receiver for receiving loopback test data through a transmitting/receiving antenna during a receiving slot which is occupied for communicating with a mobile station; a memory for storing the loopback test data received by the receiver during the receiving slot; a controller including a transmitting signal processing section, and a receiving signal processing section reading the loopback test data from the memory during a transmitting slot which is occupied for communicating with the mobile station so as to transmit the data to the transmitter; and a transmitter for transmitting the read loopback test data through the antenna during the transmitting slot.

According to a fourth aspect of the present invention, there is provided a radio apparatus according to a TDMA/TDD system, comprising: a receiver receiving first loopback test data through a transmitting/receiving antenna during a first receiving slot occupied for communicating with a first mobile station and also receiving second loopback test data through the antenna during a second receiving slot occupied for communicating with a second mobile station; a first memory for storing the first loopback test data received by the receiver during the first receiving slot; a second memory for storing the second loopback test data received by the receiver during the second receiving slot; a controller including a transmitting signal processing section, and a receiving signal processing section reading the first loopback test data from the first memory and transmitting it to the transmitter during a second transmitting slot occupied for communicating with the second mobile station, said receiving signal processing section also reading the second loopback test data from the second memory and transmitting it to the transmitter during a first transmitting slot occupied for communicating with the first mobile station; and a transmitter transmitting the read first loopback test data through the antenna during the second transmitting slot and also transmitting the read second loopback test data through the antenna during the first transmitting slot.

DESCRIPTION OF THE PREFERRED EMBODIMENTS

First Embodiment

Figure 1:
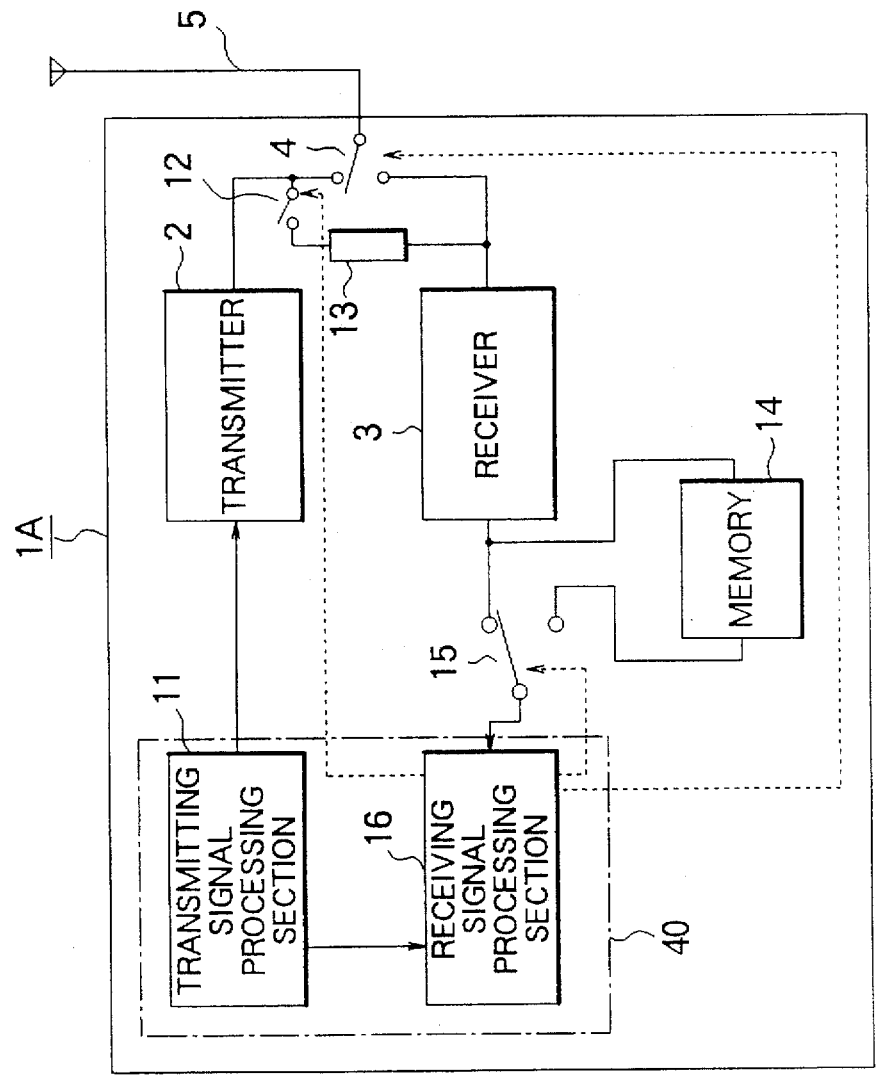
FIG. 1 illustrates a radio apparatus (base station) according to a first embodiment of the present invention.

A description will now be given of the construction of a first embodiment of the present invention with reference to FIG. 1. FIG. 1 illustrates the construction of the first embodiment of the present invention. The same reference numerals in the respective figures designate the same or corresponding components.

Referring to FIG. 1, a radio apparatus 1A having a loopback test function comprises a transmitter 2, a receiver 3, an antenna change-over switch 4, a transmitting/receiving antenna 5, a change-over switch 12, an attenuator 13, a memory 14 for temporarily storing output signal data from the receiver 3, a change-over switch 15 for selecting between a signal output from the receiver 3 and a signal read from the memory 14, and a controller 40.

The controller 40 includes CPU, ROM, RAM, interfaces and the like functioning as hardware.

The controller 40 also has a transmitting signal processing section 11 primarily for generating transmitting signals and a receiving signal processing section 16 largely for producing receiving signals.

Figure 2:
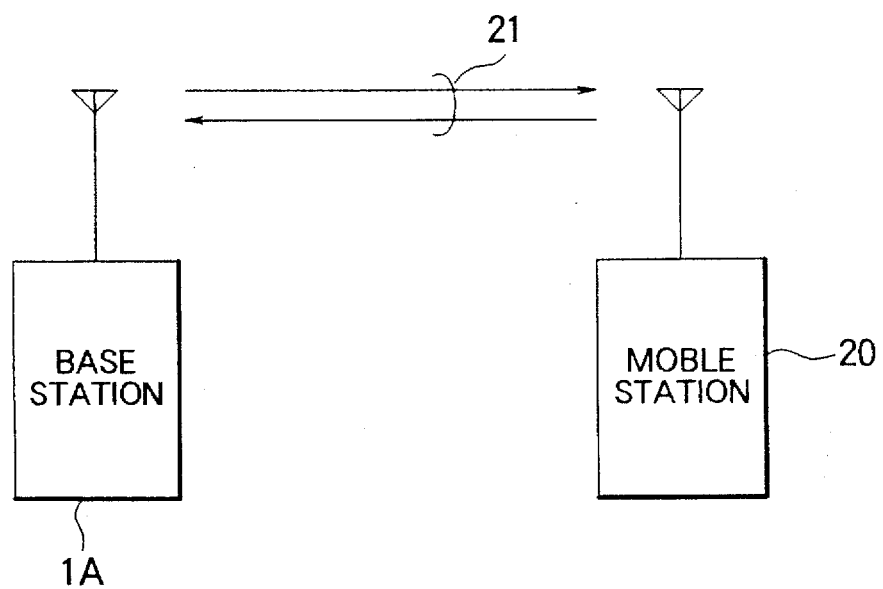
FIG. 2 illustrates a mobile communication system by use of the radio apparatus (base station) according to the first embodiment.
Figure 3:
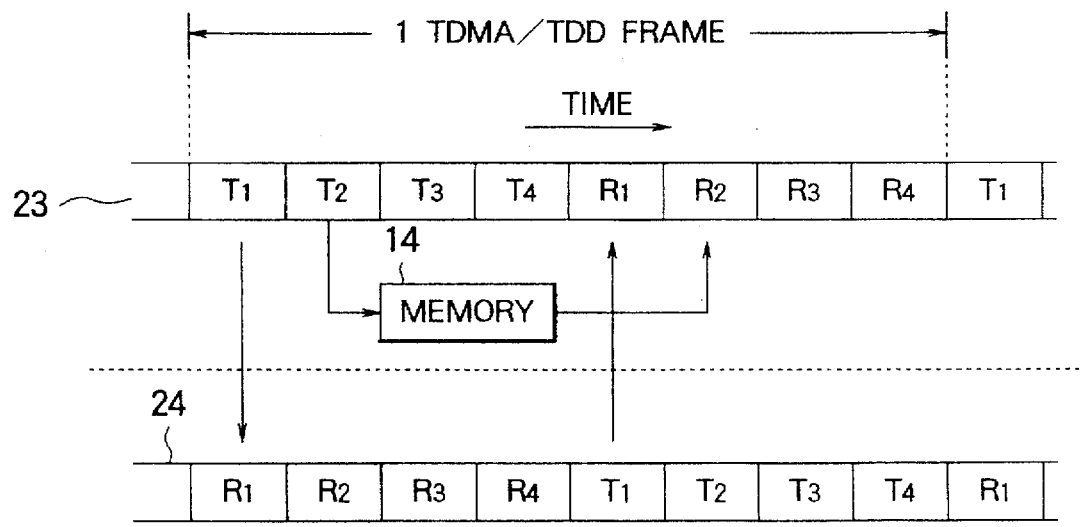
FIG. 3 illustrates a time slot of the mobile communication system according to the first embodiment.
Figure 4:
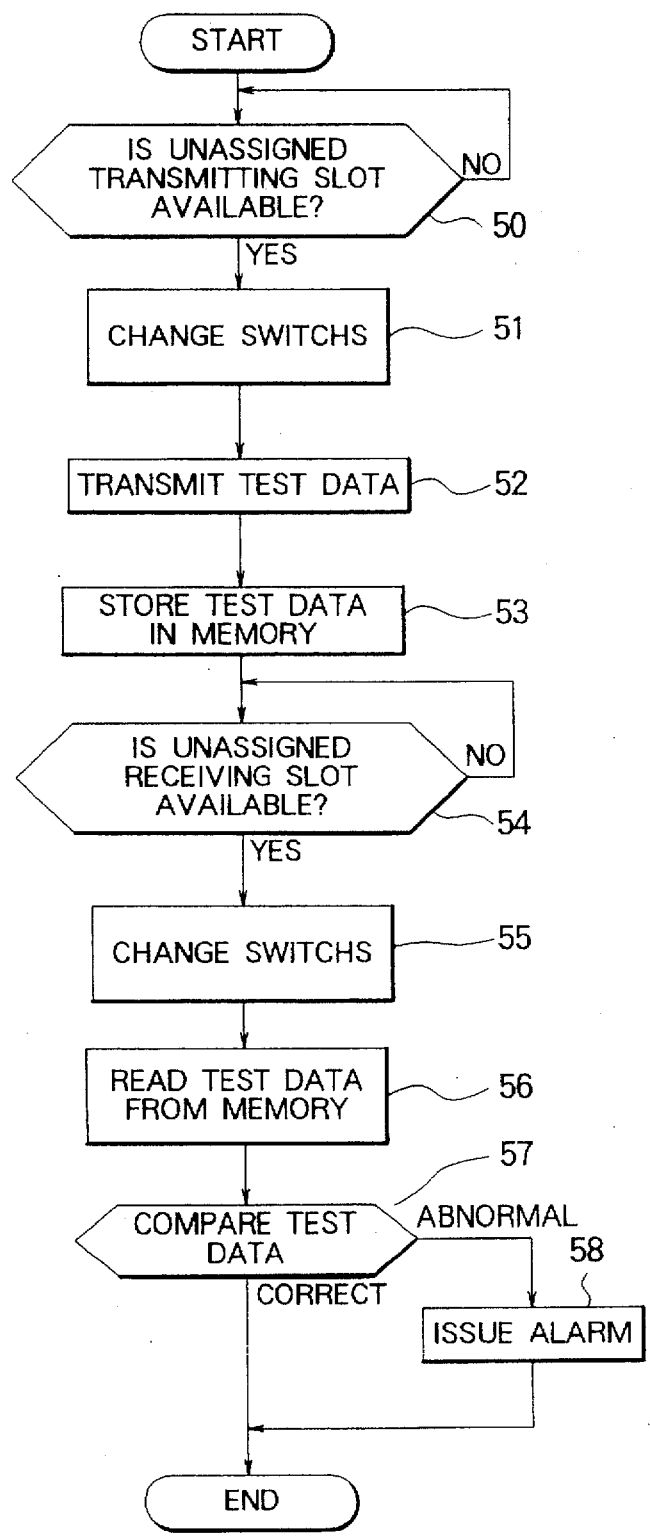
FIG. 4 is a flow chart illustrative of the operation of the base station shown in FIG. 1 during a test mode.

The operation of the first embodiment will now be explained with reference to FIGS. 2, 3 and 4. FIG. 2 illustrates a mobile communication system using the first embodiment of the present invention. FIG. 3 is a time slot according to a TDMA/TDD method of the mobile communication system shown in FIG. 2. FIG. 4 is a flow chart illustrative of the operation of the controller 40 according to the first embodiment.

FIG. 2 shows a radio apparatus (a car phone base station) 1A having a loopback test function and also illustrates one mobile station 20, such as a car phone or the like, having communications with the radio apparatus 1A. Reference numeral 21. indicates a radio communication path between the base station 1A and the mobile station 20.

FIG. 3 illustrates the communication between the base station 1A and the mobile station 20 and also shows a loopback test performed therebetween, the horizontal axis designating a time axis. FIG. 3 indicates a time slot of a mobile communication system according to a quadruplex TDMA/TDD method by way of example. This system enables one base station to communicate with a maximum of four mobile stations. 23 designates a time slot of the base station 1A, while 24 represents a time slot of the mobile station 20.

Since the quadruplex TDMA/TDD system is employed, the time slot 23 for one frame of the base station 1A is constructed of transmitting slot segments T1, T2, T3, T4 and receiving slot segments R1, R2, R3, R4. For example, it will now be assumed that a duration of 5 ms is allocated to one frame of the TDMA/TDD system, and a duration of 625 µs is allocated to each slot segment. Information for a data length of 5 ms is transmitted as burst signals to the respective four mobile stations from the base station 1A at 625 µs, at the timing shown in FIG. 3. Each mobile station compresses its own transmitting information into a data length of 625 µs after 2.5 ms since it receives a signal from the base station 1A so as to perform burst transmission. FIG. 3 illustrates a communication performed between the base station 1A and the mobile station 20 shown in FIG. 2 by use of a first slot (slot segments T1 and R1). When the base station 1A transmits information using the transmitting slot segment T1 of the time slot 23, the mobile station 20 receives such information using the receiving slot segment R1 of the time slot 24. On the other hand, when the mobile station 20 transmits information in the transmitting slot T1 of the time slot 24, the base station 1A receives such information in the receiving slot R1 of the time slot 23.

An explanation will now be given of the operation of a loopback test performed within the base station 1A by use of a second slot (slot segments T2 and R2). While the base station 1A is communicating with the mobile station 20 using the first slot, the transmitter 2 and the receiver 3 within the base station 1A are not used to communicate with the mobile station 20 during periods of second, third and fourth slots. Based on this fact, the transmitter 2 and the receiver 3 are actuated to perform a loopback test during a period of the second slot.

However, since normal communications are performed between the base station 1A and the mobile station 20 in the first slot, the construction of the time slot 23 cannot be altered. Thus, a signal transmitted from the transmitter 2 in the second slot is received by the receiver 3 so as to be temporarily stored in the memory 14. The signal which has been stored during the receiving slot segment R2 is read from the memory 14 so as to be output to the receiving signal processing section 16, thus realizing a loopback test.

The attenuator 13, and the change-over switch 12 connected to a path to the attenuator 13 are disposed to prevent radio waves used for a loopback test from radiating from the transmitting/receiving antenna 5. This attenuator 13 is also disposed for decreasing power which should be increased when transmitting signals are radiated as radio waves.

The operation of the controller 40 to perform a loopback test will now be explained with reference to FIG. 4. It is first determined whether an unassigned slot is available for transmitting a loopback test signal (test data), such as a press button dialing (DTMF: dual tone multi-frequency) signal or the like, generated in the transmitting signal processing section 11 within the controller 40 (step 50). For example, T2 is determined to be an unassigned slot in this case. With this preparation, the controller 40 first changes the antenna change-ever switch 4 to the side of the receiver 3 and connects (ON) the change-over switch 12 (step 51) through the receiving signal processing section 16.

Then, the controller 40 transmits through the transmitter 2 a loopback test signal (step 52), which then passes through the change-over switch 12 and the attenuator 13 so as to be input into the receiver 3. The received data (loopback test signal) is then stored in the memory 14 (step 53). While normal communications other than the loopback test are performed, the antenna change-over switch 4 is connected to the side of the transmitter 2 in the transmitting slot segment T1, while it is connected to the side of the receiver 3 in the receiving slot segment R1. Also, the change-over switch 12 is disconnected (OFF), and the change-over switch 75 is connected to the side of the receiver 3.

It is again determined whether an unassisted slot is available, in this case, the receiving slot segment R2 (step 54). Then, the change-over switch 15 is changed to the side of the memory 14 (step 55), and the stored received test data is read from the memory 14 (step 56). The receiving signal processing section 16 compares the received test data with the test data generated in the transmitting signal processing section 11 (step 57). The loopback test has thus been performed according to the above-described process. If the above-mentioned two items of data do not coincide with each other, the controller 40 therefore determines that an abnormality has occurred and issues an alarm to an host exchanger (step 58).

This embodiment takes advantages of the characteristics of the TDMA/TDD system so that a signal transmitted from its own transmitter 2 is received by its own receiver 3 within the base station 1A during an unassigned slot period, thereby realizing a loopback test. Since the base station 1A performs a loopback test by use of its own transmitter 2 and receiver 3, a tester (transmitter and receiver) specifically used for a loopback test is not required, which further eliminates the necessity of considering a possible breakdown of the loopback test transmitter and receiver. The first embodiment also offers the advantage of performing a loopback test while normal communications are being made. Further, since the base station utilizes its own transmitter and receiver, there can be an improvement in the reliability of the loopback test.

The first embodiment has been explained in which a loopback test is performed during the second slot (T2, R2). However, since only one mobile station in the first slot is communicating with the base station 1A, a loopback test may also be performed in the third slot (T3, R3) or the fourth slot (T4, R4). When all the four mobile stations are having normal communications with the base station 1A, no unassigned slot is available, and accordingly, it is impossible to perform a loopback test. Advantages similar to those obtained in the first embodiment are not limited to a quadruplex system, but may be obtained in duplex, triplex, fivefold, sixfold, sevenfold, eightfold, ninefold, tenfold and twentyfold systems. In short, any multiplex system may be employed as long as at least one unassisted (not in use) slot is available.

Second Embodiment

In the above-described first embodiment, an unassigned slot is employed to transmit a loopback test signal and to receive it, thereby realizing a loopback test. In a second embodiment, a signal used in a transmitting slot segment which is occupied for communicating with the mobile station is simultaneously received by its own receiver, thus performing a loopback test.

Figure 5:
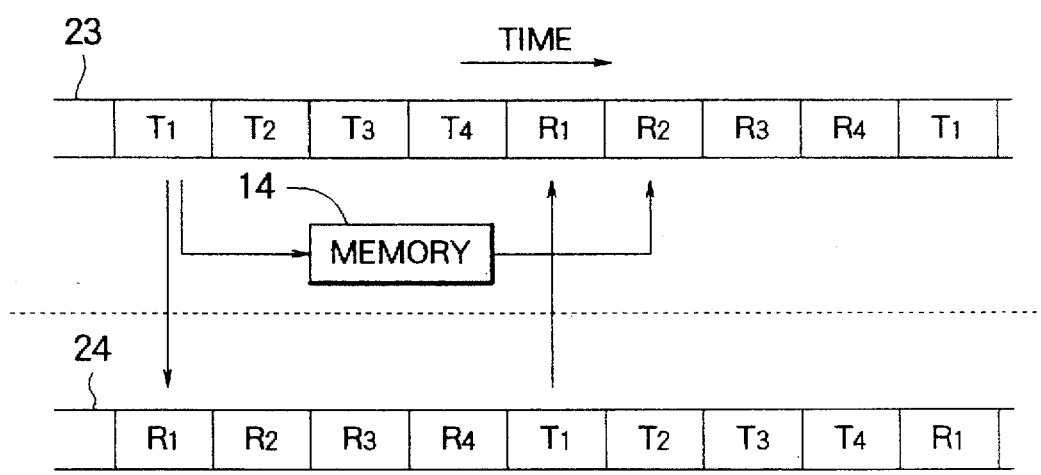
FIG. 5 illustrates a time slot of a mobile communication system according to a second embodiment of the present invention.
Figure 6:
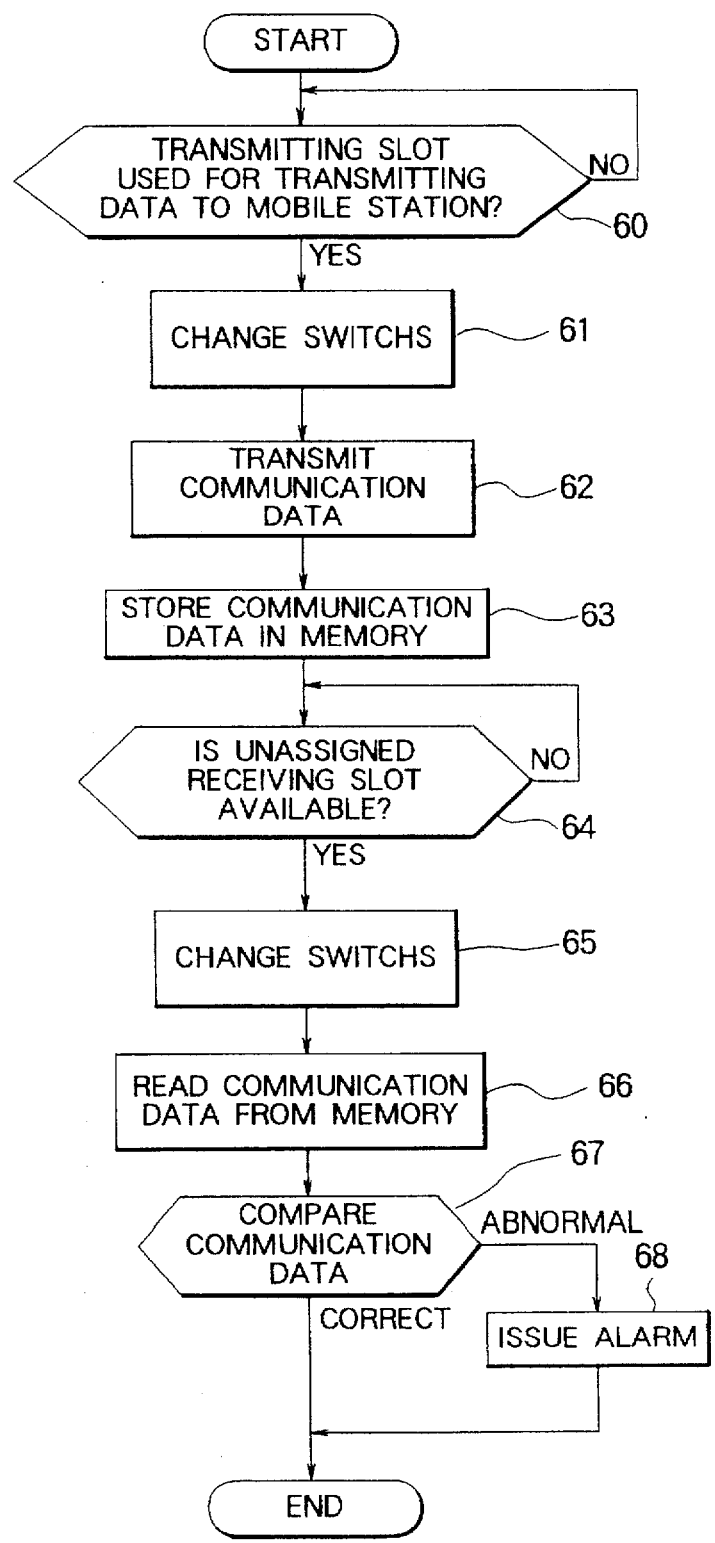
FIG. 6 is a flow chart illustrative of the base station of the second embodiment during the test mode.

A base station of the second embodiment is constructed in a manner similar to the first embodiment shown in FIG. 1, except for the operation timing illustrated in FIGS. 5 and 6. FIG. 5 illustrates a time slot of a mobile communication system according to the second embodiment of the present invention. FIG. 6 is a flow chart illustrative of the operation of the controller 40 according to the second embodiment.

An explanation will now be given of the operation of the controller 40 to perform a loopback test according to this embodiment with reference to FIG. 6. In the first slot during which normal communications are being made, that is, during the transmitting slot segment T1 of the time slot 23 of the base station 1A (step 60), the controller 40 changes the antenna change-over switch 4 to the side of the transmitter 2 and connects (ON) the change-over switch 12 through the receiving signal processing section 16 (step 61). Subsequently, the controller 40 actuates the transmitter 2 and simultaneously operates the receiver 3 and then writes a signal which is usually employed for normal communications (communication data) into the memory 14 (steps 62 and 63).

During the period of the receiving slot segment R2, which is unassigned, of the time slot 23 (step 64), the controller 40 changes the change-over switch 15 to the side of the memory 14 (step 65) so as to read the received communication data from the memory 14 (step 66). The controller 40 then compares the received communication data with communication data stored in the transmitting signal processing section 11 (step 67). The loopback test has thus been performed according to the above-described process. If the above-mentioned two items of data do not coincide with each other, the controller 40 determines that an abnormality has occurred and issues an alarm to a host exchanger (step 68). Hence, it is not necessary to generate loopback test transmitting data (test data) by the transmitting signal processing section 11. The other advantages are similar to those obtained in the first embodiment.

Third Embodiment

Figure 7A:
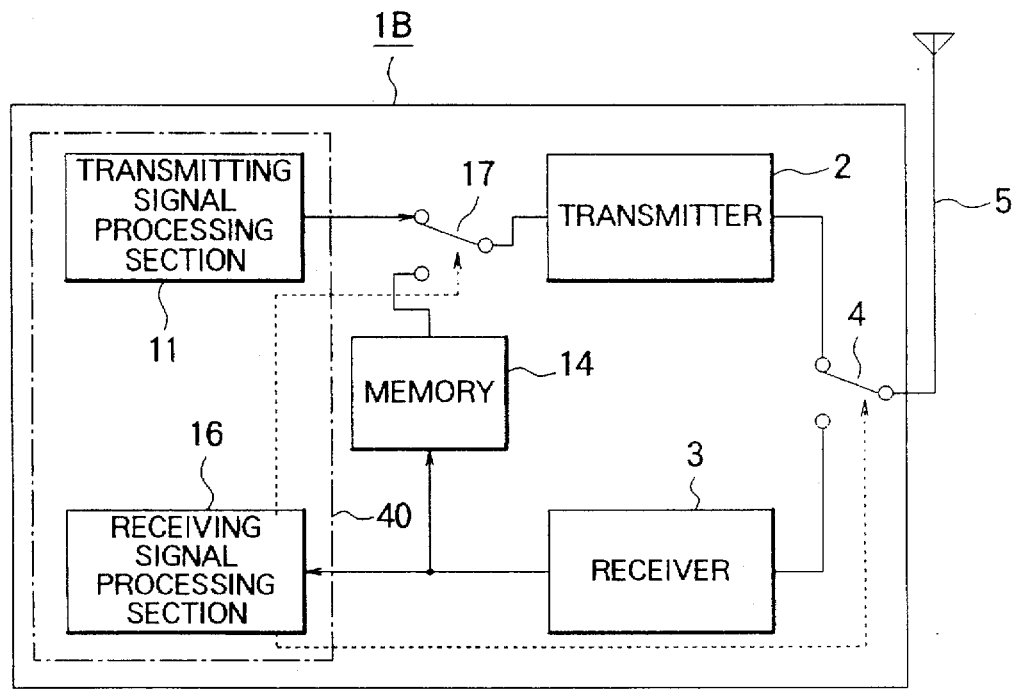
FIG. 7A illustrates a radio apparatus (base station) according to a third embodiment of the present invention.
Figure 7B:
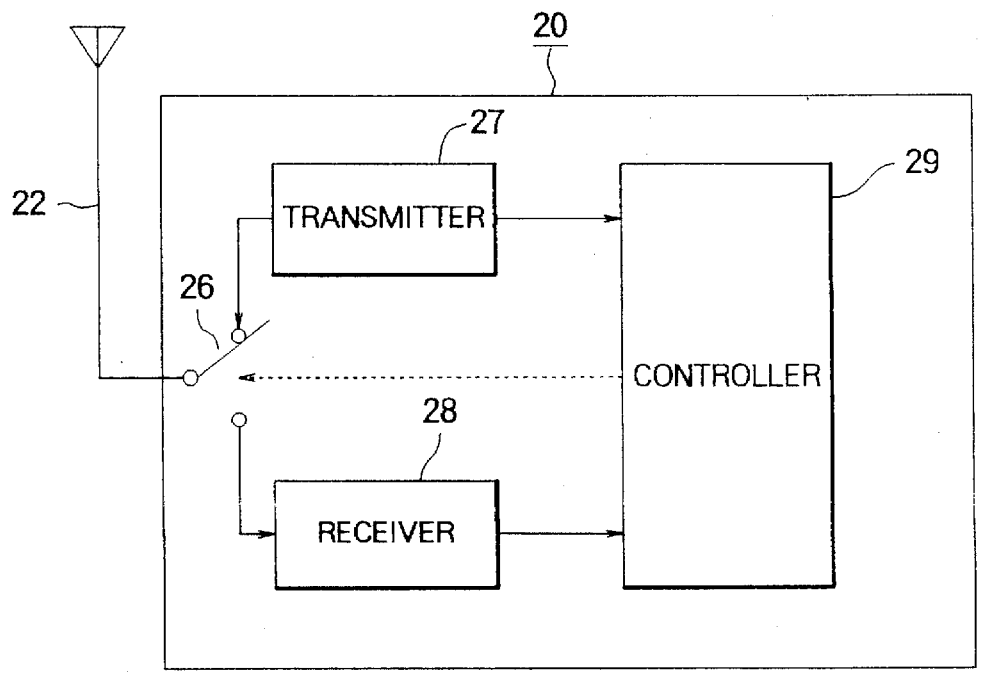
FIG. 7B illustrates a radio apparatus (mobile station) according to the third embodiment.
Figure 8:
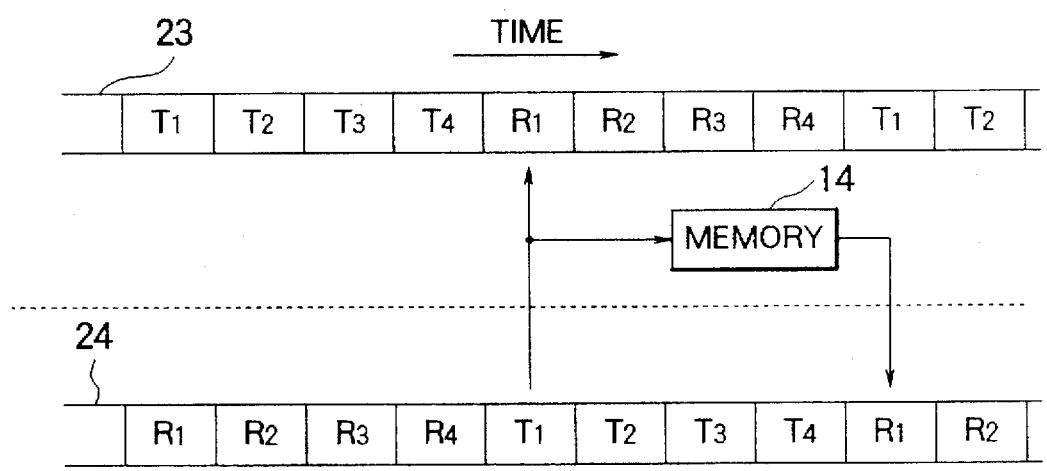
FIG. 8 illustrates a time slot of the mobile communication system according to the third embodiment.
Figure 9:
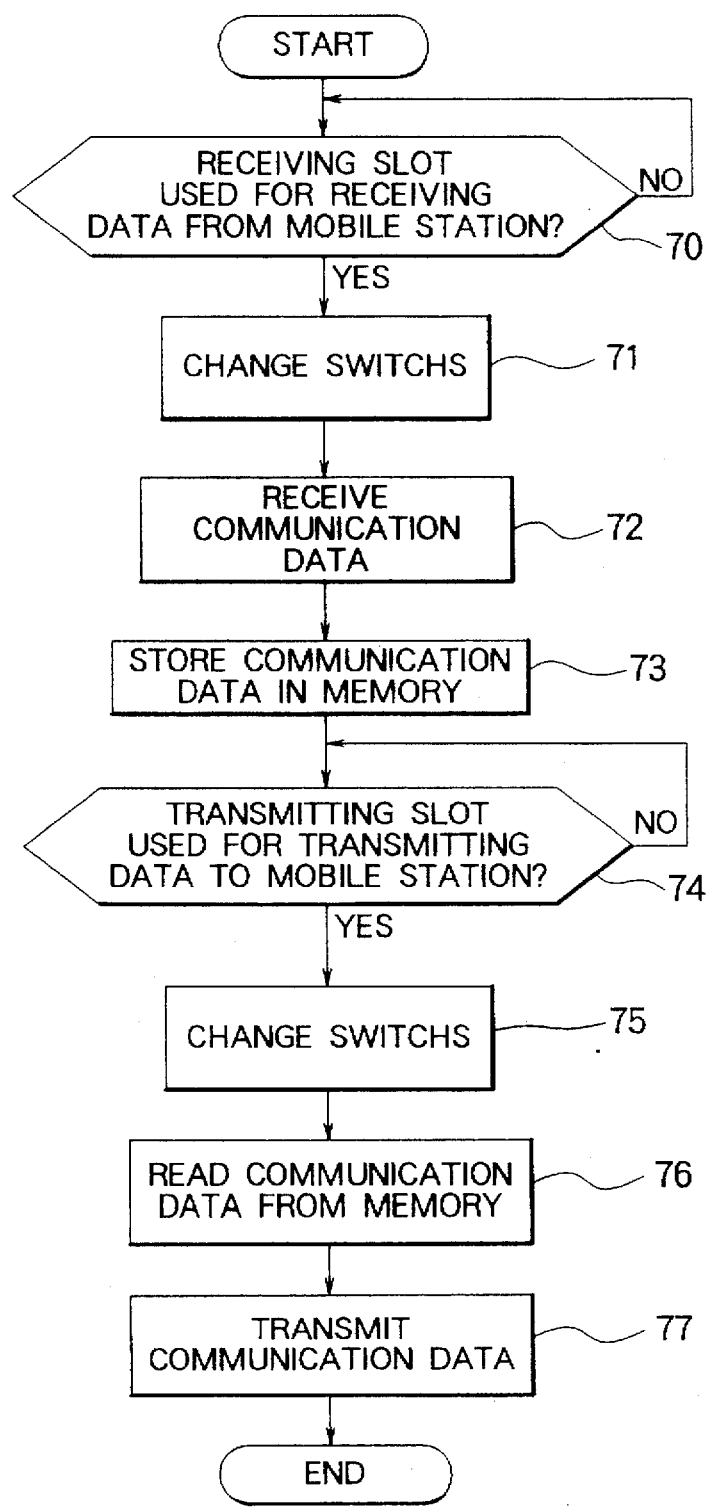
FIG. 9 is a flow chart illustrative of the operation of the base station shown in FIG. 7A during the test mode.

A third embodiment of the present invention will now be described with reference to FIGS. 7A, 7B, 8 and 9. FIG. 7A illustrates the construction of a base station according to the third embodiment of the present invention. FIG. 7B illustrates the construction of a mobile station according to the third embodiment. FIG. 8 illustrates a time slot of a mobile communication system according to this embodiment. FIG. 9 is a flow chart illustrative of the operation of the controller 40 of the base station according to this embodiment.

Referring to FIG. 7A, a radio apparatus (base station) 1B comprises a transmitter 2, a receiver 3, an antenna change-over switch 4, a transmitting/receiving antenna 5, a memory 14 for temporarily storing output signal data from the receiver 3, a change-over switch 17 for selecting between a signal read from the memory 14 and a transmitting signal from a transmitting signal processing section 11, and a controller 40.

Referring to FIG. 7B, a radio apparatus (mobile station) 20 comprises a transmitting/receiving antenna 22, an antenna change-over switch 26, a transmitter 27, a receiver 28, and a controller 29 formed of CPU, ROM, RAM, interfaces and the like.

With this construction shown in FIG. 7A, a signal received from the mobile station 20 can be looped within the base station 1B so as to be transmitted back to the mobile station 20, thus carrying out a loopback test of the mobile station 20 through use of the base station 1B.

That is, the base station 1B of this embodiment has the memory 14 for storing communication data (test data) received from the mobile station 20. In the mobile station test mode, in a receiving slot segment R1 used for receiving a signal from the mobile station 20 (step 70), the controller 40 changes the antenna change-over switch 4 to the side of the receiver 3 through the receiving signal processing section (step 71). The controller 40 then receives radio waves from the mobile stallion 20 (step 72), and writes the test data into the memory 14 (step 73).

Subsequently, at the timing of the transmitting slot segment T1 during which data is transmitted to the mobile station 20 (step 74), the controller 40 changes the change-over switch 17 to the side of the memory 14 (step 75) so as to read the test data from the memory 14 (step 76) and to directly transmit the data to the mobile station 20 (step 77). This process enables the mobile station 20 to perform a loopback test without requiring a memory. When a loopback test is performed, it is required that the mobile station 20 notify the base station 1B that the apparatus will go into the mobile test mode before it transmits the test data to the base station 1B.

Fourth Embodiment

Figure 10:
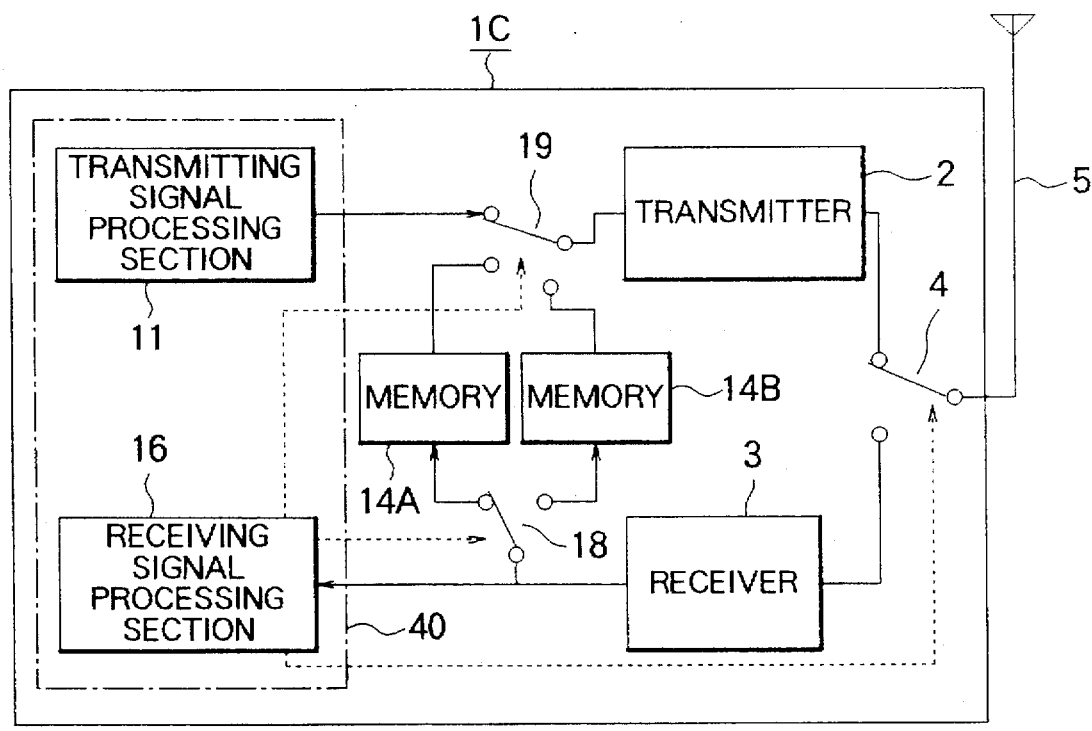
FIG. 10 illustrates a radio apparatus (base station) according to a fourth embodiment of the present invention.
Figure 11:
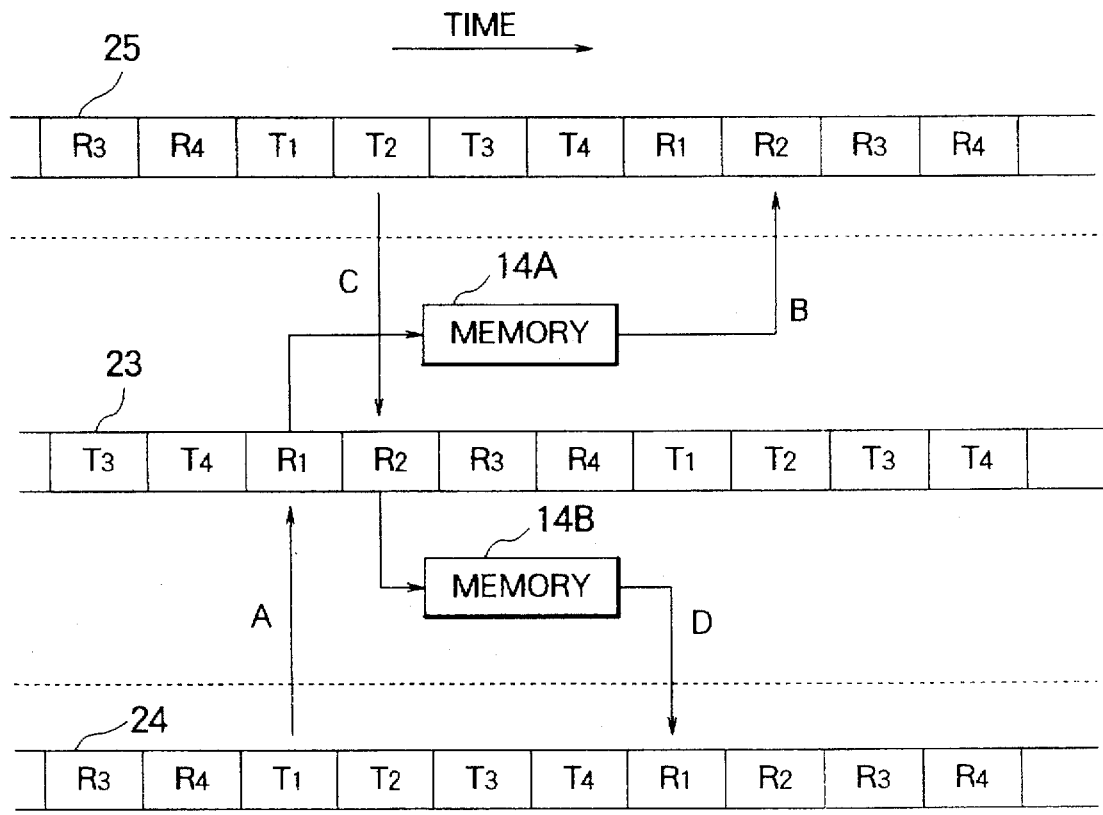
FIG. 11 illustrates a time slot of the mobile communication system according to the fourth embodiment.
Figure 11:
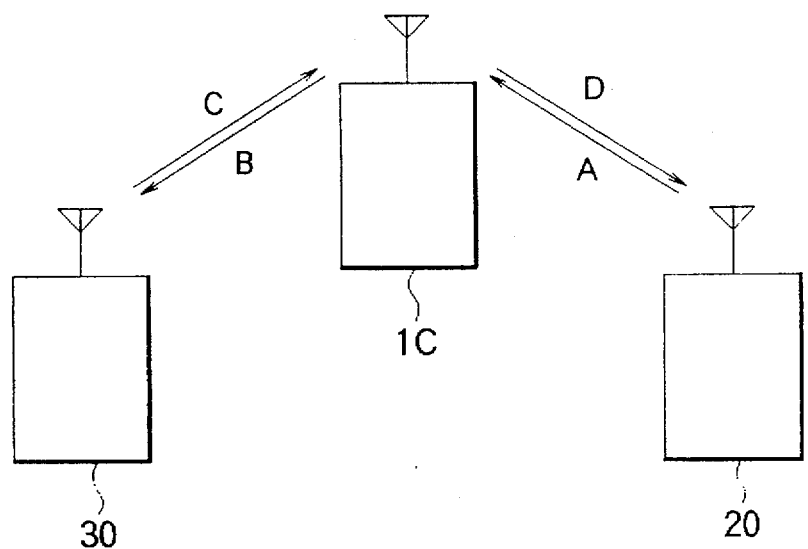
Figure 12:
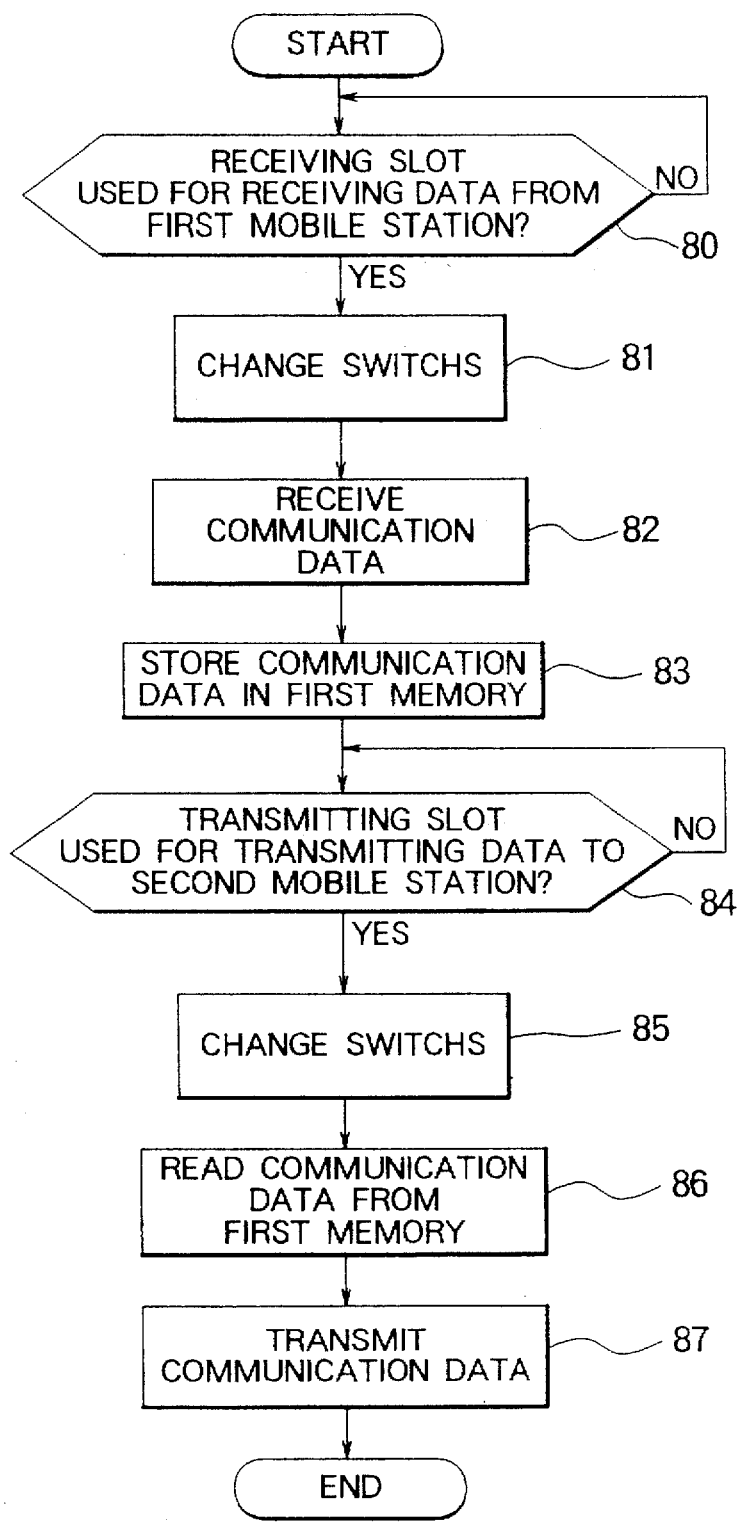
FIG. 12 is a flow chart illustrative of the operation of the base station shown in FIG. 10 during the test mode.
Figure 13:
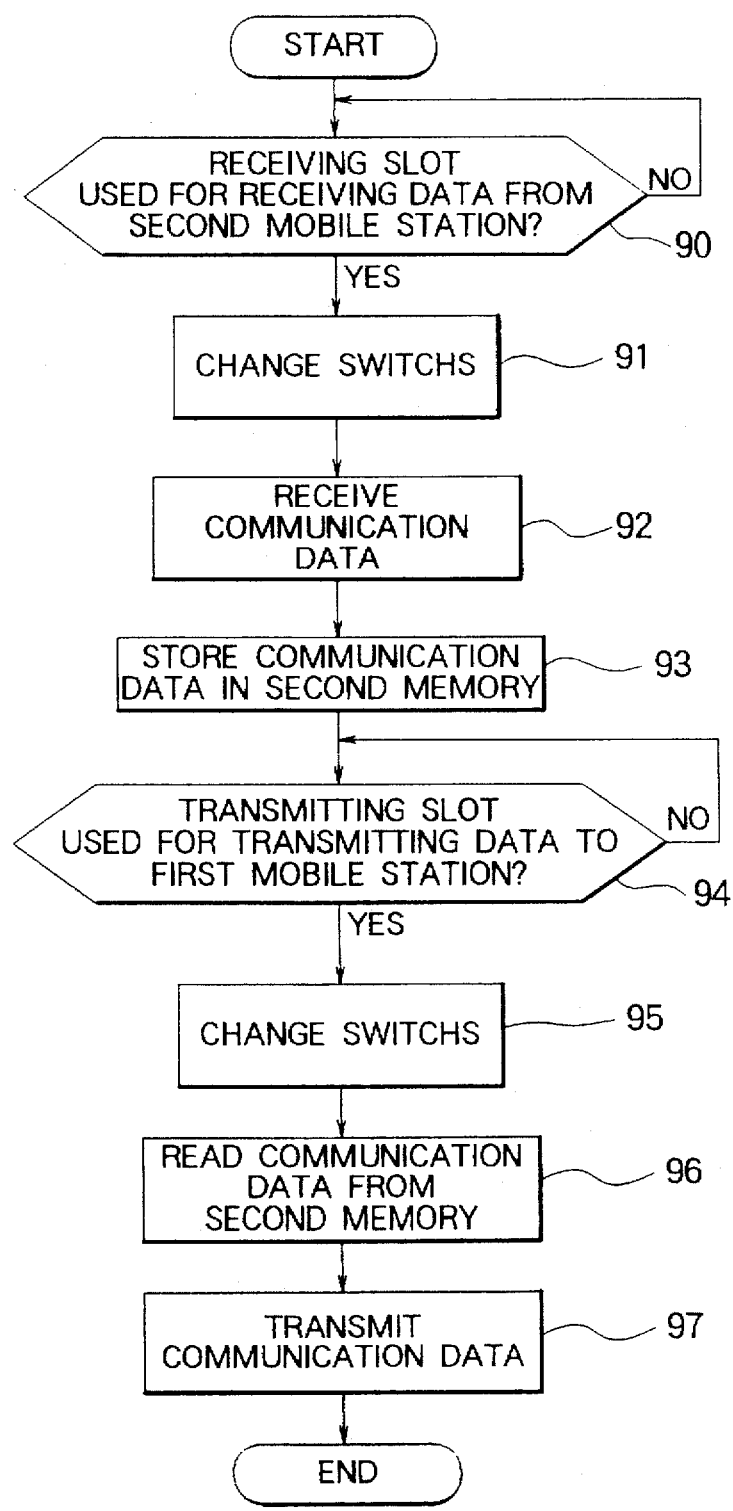
FIG. 13 is a flow chart illustrative of the operation of the base station shown in FIG. 10 during the test mode.
Figure 14:
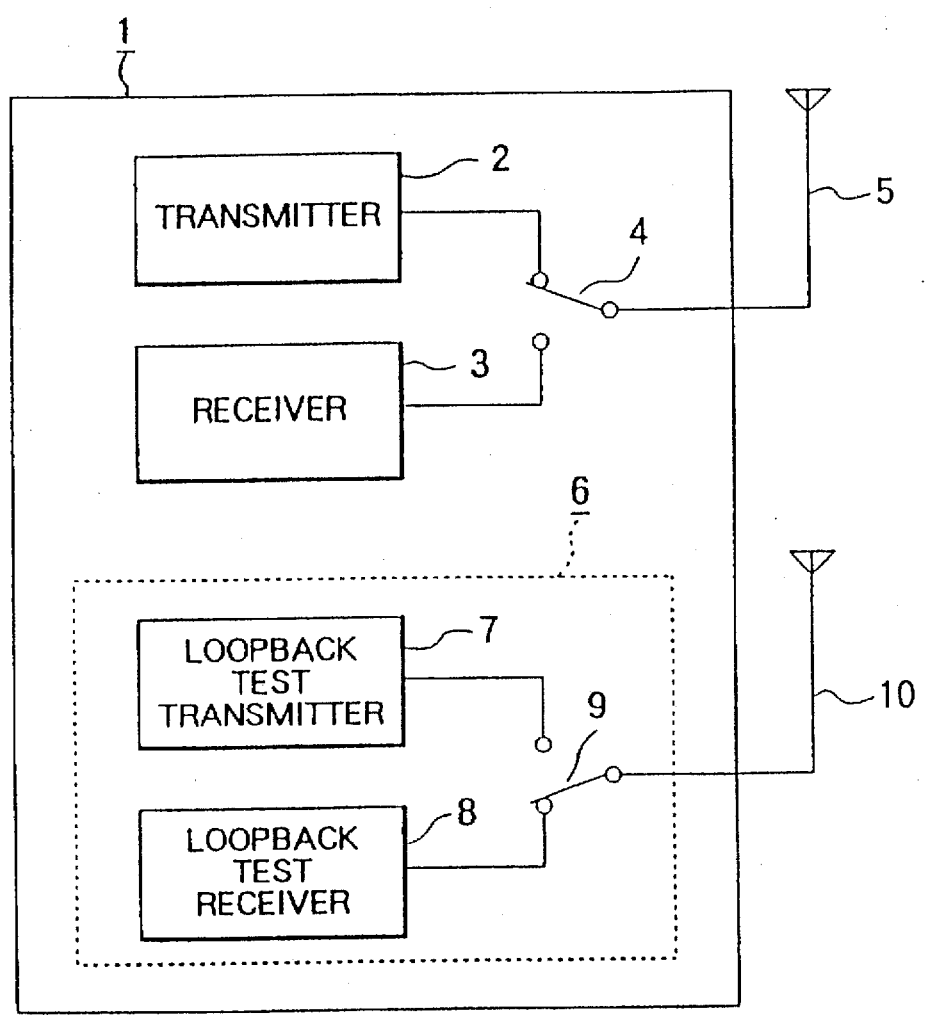
FIG. 14 is a block diagram illustrative of the construction of a conventional radio apparatus.

Further, a fourth embodiment of the present invention will be explained with reference to FIGS. 10, 11, 12 and 13. FIG. 10 illustrates the construction of the fourth embodiment of the present invention. FIG. 11 illustrates a time slot of a mobile communication system according to the fourth embodiment. FIGS. 12 and 13 are flow charts illustrative of the operation of a controller according to this embodiment.

Referring to FIG. 10, a radio apparatus (base station) 1C comprises a transmitter 2, a receiver 3, an antenna change-over switch 4, a transmitting/receiving antenna 5, memories 14A and 14B for temporarily storing output signal data from the receiver 3, a change-over switch 18, a change-over switch 19 for selecting between a signal read from the memory 14A or 14B and a transmitting signal from the transmitting signal processing section 11, and a controller 40.

Referring to FIG. 11, reference numeral 30 designates a mobile station constructed in a manner similar to the mobile station 20. 25 indicates a time slot of the mobile station 30.

When the base station 1C of this embodiment having two memories 14A and 14B is operated according to a time slot shown in FIG. 11, it can function as a relay station. With this arrangement, the mobile stations 20 and 30 are able to communicate with each other via the base station 1C. One mobile station is able to perform a loopback test through use of the base station IC and the other mobile station.

The base station 1C receives radio waves from two mobile stations 20 and 30 so as to write signals into the memories 14A and 14B, respectively. Then, it reads one of the signals transmitted from one mobile station and transmits it to the other station at the timing of a transmitting slot segment, thus relaying between the base stations 20 and 30.

An explanation will now be given of the operation of the controller 40 to perform a loopback test with reference to FIGS. 12 and 13.

In a first receiving slot segment R1 used for receiving data from the mobile station 20 (step 80), the controller 40 of the base station 1C changes the antenna change-over switch 4 and the change-over switch 18 (step 81). The controller 40 thus receives communication A from the mobile station 20 (step 82) and writes it into the memory 14A. (step 83). Subsequently in a second transmitting slot segment 72 used for transmitting data to the mobile station 30 (step 84), the controller 40 changes the change-over switch 19 and the antenna change-over switch 4 (step 85). The controller 40 thus reads communication B from the memory 14A (step 86) so as to transmit it to the mobile station 30 (step 87).

Further, in a second receiving slot segment R2 used for receiving data from the mobile station 30 (stag 90), the controller 40 of the base station 1C changes the antenna change-over switch 4 and the change-over switch (step 91). The controller 40 thus receives communication C from the mobile station 30 (step 92) and writes it into the memory 14B (step 93). Subsequently, in a first transmitting slot segment T1 used for transmitting data to the mobile station 20 (step 94), the controller 40 changes the change-over switch 19 and the antenna change-over switch 4 (step 95). The controller 40 thus reads communication D from the memory 14B (step 95) and transmits it to the mobile station 20 (step 97).

According to the above-described process, the mobile station 20 is able to communicate with the other mobile station 30 using its own slot, i.e, the first slot, thus carrying out a loopback test. The same applies to the mobile station 30. That is, the mobile station 30 is able to communicate with the mobile station 20 using its own slot, i.e., the second slot, thus performing a loopback test. This enables both the mobile stations 20 and 30 to each perform a loopback test without requiring a memory. When a loopback test is performed, it is required that the mobile stations 20 and 30 notify the base station 1C that the apparatus will go into the mobile test mode before they transmit the test data to the base station 1C.

What is claimed is:

1. A radio apparatus according to a TDMA/TDD system, comprising:

a transmitter for transmitting data during a transmitting slot;

an attenuator for attenuating said data transmitted from said transmitter;

a receiver for receiving said data attenuated by said attenuator during said transmitting slot;

a memory for storing said data received by said receiver; and a controller for comparing the data read from said memory with the data transmitted from said transmitter so as to assess normality of said apparatus during an unassigned receiving slot.

2. A radio apparatus according to claim 1, wherein said transmitting slot is unassigned, and said data is used for a loopback test.

3. A radio apparatus according to claim 2, wherein said controller comprises a transmitting signal processing section and a receiving signal processing section, said transmitting signal processing section generating said loopback test data and transmitting it to said transmitter, said receiving signal preceding section comparing the loopback test data read from said memory with the loopback test data generated in said transmitting signal processing section, and upon such a comparison, issuing an alarm when an abnormality has occurred.

4. A radio apparatus according to claim 1, wherein said transmitting slot is occupied for communicating with a mobile station, and said data is communication data used for communicating with said mobile station.

5. A radio apparatus according to claim 4, wherein said controller comprises a transmitting signal processing section and a receiving signal processing section, said transmitting signal processing section generating said communication data and transmitting it to said transmitter, said receiving signal processing section comparing the communication data read from said memory with the communication data generated in said transmitting signal processing section, and upon such a comparison, issuing an alarm when an abnormality has occurred.

6. A radio apparatus according to a TDMA/TDD system, comprising:

a receiver for receiving data through a transmitting/receiving antenna during a receiving slot;

a memory for storing said data received by said receiver during said receiving slot;

a controller for reading the data from said memory during a transmitting slot; and a transmitter for transmitting said data read from said memory during said transmitting slot through said antenna, wherein said receiving slot is formed of a first receiving slot segment occupied for communicating with a first mobile station and a second receiving slot segment occupied for communicating with a second mobile station, said data being loopback test data used for communicating with said first mobile station and also used for communicating with said second mobile station, said transmitting slot being formed of a first transmitting slot segment occupied for communicating with said first mobile station and a second transmitting slot segment occupied for communicating with said second mobile station.

7. A radio apparatus according to claim 6, wherein said control let comprises a transmitting signal processing section and a receiving signal processing section, said memory including first and second memory portions, said receiving signal processing section reading the loopback test data from said first memory portion and transmitting it to said transmitter and also reading the loopback test data from said second memory portion and transmitting it to said transmitter.

* * * * *

UNITED STATES PATENT AND TRADEMARK OFFICE
CERTIFICATE OF CORRECTION

PATENT NO. : 5,742,589
DATED : April 21, 1998
INVENTOR(S) : Takashi Murata

It is certified that error appears in the above-indentified patent and that said Letters Patent is hereby corrected as shown below:

<u>In the Figures:</u>  In FIG. 2, please change "MOBLE" to -- MOBILE --.

Signed and Sealed this

Twenty-fifth Day of August, 1998

Attest:

BRUCE LEHMAN

*Attesting Officer*  *Commissioner of Patents and Trademarks*